006# United States Patent

[11] 3,625,807

| [72] | Inventor | Paul H. Beemer |
| | | Whittier, Calif. |
| [21] | Appl. No. | 863,373 |
| [22] | Filed | Oct. 2, 1969 |
| [45] | Patented | Dec. 7, 1971 |
| [73] | Assignee | W. W. Henry Company |
| | | Huntington Park, Calif. |

[54] TILE ADHESIVE
14 Claims, No Drawings

[52] U.S. Cl. ........................................ 161/38,
156/333, 156/334, 161/243, 161/253, 161/254,
260/8, 260/17 R, 260/23.7 A, 260/23.7 M, 260/27
BB, 260/29.7 R, 260/752, 260/753
[51] Int. Cl. ........................................ B32b 27/28,
C08c 13/02, C08d 11/02
[50] Field of Search ........................................ 260/23.7 A,
23.7 M, 29.7 R, 752, 753, 8, 17 R, 27 BB; 161/38;
156/333, 334

[56] References Cited
UNITED STATES PATENTS

| 2,407,038 | 9/1946 | Stamberger | 260/27 X |
| 3,103,858 | 9/1963 | Lauren | 260/29.7 UX |

OTHER REFERENCES

Chatfield, " Varnish Constituents," (1953), pgs. 529, 541, and 542.

Whitby, " Synthetic Rubber," (1954), pgs. 413 to 417 and 1037.

*Primary Examiner*—Donald E. Czaja
*Assistant Examiner*—Donald J. Barrack
*Attorney*—Lindenberg and Freilich ABSTRACT: An adhesive especially adapted for installing flexible flooring tiles to vapor-impermeable flooring. The adhesive includes an oil-in-water emulsion containing an elastomer and an air drying tackifying resin in the oil phase and a protective colloid and an emulsifying agent in the water phase.

TILE ADHESIVE

BACKGROUND OF THE INVENTION

1. Field of the Invention:

The present invention relates to novel adhesive compositions and to methods of adhering flooring material to flooring substrates. More particularly, this invention relates to air drying adhesive compositions particularly adapted for use in installing flexible construction tile or sheets on nonporous flooring surfaces.

2. Description of the Prior Art:

Liquid adhesive compositions of many known types are applied to surfaces and after evaporation of a portion of the volatiles, flooring materials are applied to the film of adhesive residue. Solvent types comprising an adhesive base dissolved in a volatile solvent or emulsion types comprising an adhesive base dispersed in a water phase can be utilized for this purpose.

The emulsion type adhesives do not contain substantial amounts of solvent and therefore, flammability and toxicity hazards are lessened. The emulsion type adhesives however, require a relatively longer period for evaporation of volatiles, are less stable to high and low temperature conditions and may not develop sufficient tack for the intended purpose.

These problems are considerably magnified when it is desired to recover a flooring surface in which there already exists an installed surface containing a vapor-impermeable floor covering material such as linoleum, vinyl, vinyl-asbestos, asphalt, tile or the like. Once the new flooring material is laid down, there is no path for the water vapor to exit except at the edge, so that the adhesive dries very slowly Such installations have required extreme caution and the use of a very thin film of adhesive in order to speed set and to avoid indentations being formed in the floor covering as a result of the soft bed of adhesive on the back of the applied flooring material. In fact, in most instances, the flooring has been torn up to expose the base floor and the new floor covering applied directly to the base flooring. Another technique has been to apply an underlay of plywood or hardboard over the existing flooring, this provides a new porous base to receive the adhesive and the floor covering.

Some types of floor tiles are easier to install. Vinyl asbestos and asphalt tile exhibit a tendency to "cold flow" and will settle to conform to irregularities in the floor. Furthermore, these tiles normally exhibit a little tendency to shrink or curl. Therefore, weak pressure-sensitive adhesives which remain permanently sticky can be used with these tiles. However, vinyl tile is a very tough material and has a very high coefficient of expansion and contraction on aging. This tile often tends to shrink and curl on aging. Therefore the weak, permanently sticky adhesive materials are not normally adequate for installing vinyl tiles. Materials which set to a harder condition must be used.

Vinyl tiling has been most adaptable to creating attractive visual effects and for simulating other desirable materials of construction such as brick, ceramic tile and It is being used extensively in remodeling applications where the existence of prior flooring materials creates the problems discussed above, It would be very desirable to be able to install the vinyl tile directly to the floor surface without the necessity of removing the existing flooring material nor of covering it with a further subflooring.

OBJECTS AND SUMMARY OF THE INVENTION

It is therefore an object of the present invention to provide a liquid adhesive composition which can be directly and readily applied to a wide variety of surfaces without the need for special tools or high skills and which effectively and permanently bonds vinyl tile to such surfaces.

A further object of the invention is a provision of a liquid adhesive which when applied to a nonporous flooring substrate evaporatively dries to a first pressure-sensitive condition which receives vinyl tiling and which further dries and air cures to a permanently set condition which holds the tile to said surfaces without curling, bending or peaking.

A still further object of the invention is the provision of a stable oil in water liquid emulsion adhesive possessing a nonhazardous flash point and which can be safely utilized to lay tiles in indoor installations.

Yet another object of the invention is the provision of a liquid adhesive particularly adaptable for installing vinyl tiles to preexisting flooring surfaces and which forms an adherent film which is virtually colorless and sets to a fully cured condition.

It is a further object to provide an adhesive generally utilizable to installing critical flexible flooring material such as vinyl and also less difficult to install materials such as vinyl asbestos and asphalt.

These and other objects and many attendant advantages of the invention will become apparent as the description proceeds.

The adhesive in accordance with the invention includes an oil-in-water emulsion. The oil phase comprises dispersed particles of an elastomer base, a volatile, water immiscible organic solvent and an air drying, plasticized, mutually compatible tackifying resin. The water phase includes an emulsifying agent. When extended stability is desirable, the water phase includes a protective colloid, and water resistance of the film can be improved by the use of a fugitive type of emulsifying agent.

The ratio of the amount of oil phase to water phase as well as the ratio of the components relative to one another can be varied within wide limits. Of course, improved results are obtained if these parameters are controlled within limits. Liquid adhesive compositions having the most desired combination of properties are obtained when the liquid composition contains 10 to 25 percent of elastomer solids and 10 to 50 percent of plasticized tackifying resin solids. The amount of water and solvent is also controlled within ranges to provide ready spreadability and the formation of a stable emulsion with ready evaporation of the volatiles in a short period.

The oil phase which comprises between about 35 to 70 percent of the composition has the following composition in parts by weight of the total composition:

| Elastomer | 10–25 percent |
| Tackifying Resin | 10–30 percent |
| Dying PLasticizer | 5–20 percent |
| Solvent | 5–10 percent |

The water phase has the following composition in parts by weight:

| water | 30–50 percent |
| Emulsifier | 1.5–8 percent |
| Protective Colloid | 0–5 percent |

In one procedure according to the invention, the novel oil-in-water emulsion adhesive is produced by forming an aqueous solution containing the protective colloid and the emulsifier. A solvent solution of an air drying plasticized tackify resin is added to form an emulsion. A elastomer latex is then added to the emulsion and the mixture stirred until homogenous.

The liquid adhesive composition of the invention can be formed from a wide variety of different basic ingredients. One of the essential ingredients is the elastomer which adds toughness to the residue film and also is responsible for at least part of the required initial pressure-sensitive tackiness. The elastomeric materials are water insoluble and are inherently tacky or are capable of being rendered tacky by mixture with compatible tackifying resins. Preferably the elastomers are natural rubber or butadiene or isoprene synthetic polymers or copolymers such as butadiene-isobutylene copolymers, butadiene-acrylonitrile copolymers, butadiene-styrene copolymers, polychloroprene or similar elastomers. A combination of the above elastomers may be utilized.

The oxidative-drying plasticized tackifying resins improve the pressure-sensitive tackiness during the initial stages of the use of the compositions and furthermore air dry to provide a hard, tough, rigid final film which prevents curling or release of the vinyl tile. These materials are water-insoluble, rubber tackifying and rubber compatible resins. For the purposes of the invention, it is important that the resin or the plasticizing agent contain unsaturation and preferably conjugated unsaturation such that on contact with air the plasticized resin dries and include to convert the total adhesive mass into a hard, unyielding, cured condition.

Preferred resin materials include unsaturated natural resins such as rosin or derivatives thereof, such as rosin esters of polyols such as glycerol or pentaerythritol, hydrogenerated rosins or dehydrogenerated rosins. Esters of tall oil which comprises about 45 percent unsaturated fatty acids and 45 percent rosin acids are a suitable tackifying resin source as are the unsaturated alkyd resins which are fatty acid modified esters of polyfunctional acids such as phthalic anhydride and a triol such as glycerol. Resins having a ball and ring melting point below 160° F. are found to have better tack properties.

The resin is present in the dispersed oil phase dissolved in a volatile organic solvent preferably an organic solvent having a boiling point between 100° and 2 250° F. The solvent may be aliphatic or aromatic for example, naphtha, hexane, benzene or toluene.

The resin solution also contains an air drying plasticizer oil if required. Certain of the unsaturated tackifying resins such as tall oil ester or a drying oil modified alkyd resin do not require the presence of a drying oil. However, in the case of rosin, a natural or synthetic drying oil containing a substantial amount of conjugated unsaturation such as linseed oil, tall oil or china wood oil should be present.

Through an emulsifying agent such as sodium hydroxide or potassium hydroxide can be added directly to the water phase, the emulsifying agent can be formed in situ by providing the anion in the oil phase and the cation in the water phase. The oil soluble anion portion of the emulsifying agent is preferably a fatty acid, particularly those containing 12–18 carbon atoms such as oleic acid, stearic acid, and palmitic acid. The fatty acid is present in an amount of about 0.5 to 3 percent of the composition.

The cation portion of the emulsifying agent is present in the water phase in an amount at least sufficient to neutralize the anion. Cations suitable for forming fugitive emulsifying agents are monovalent volatile amine materials such as ammonia, alkylamines, alkanol amines e.g., ethylamine, propyl amine, monoethanolamine (MEA) or triethanolamine (TEA). The resin solution may also contain foam suppressing agents such as a small amount below 0.01 percent of an oil soluble surface active agent and a small amount suitably below 0.5 percent of a drier such as a metal naphthenate.

Another preferred ingredient of the water phase is a protective colloid. This ingredient improves stability of the emulsion when subjected to high and low temperatures during storage and enables the spread film to break and release solvent and thus prevents skin drying. Water soluble salts of polyacrylic acid such as ammonia are suitable materials for use in the liquid adhesive of the invention. These materials are hydrophilic, water soluble or dispersible polymers having a molecular weight usually above 1,000. Other examples of suitable colloids are hydrophilic cellulose esters, ethers or salts thereof, hydrophilic proteins such as albumin, casein, alginates, gums, and synthetic polymers such as polyvinyl alcohol or polyacrylamide.

The following examples are only presented for purposes of illustration, it being understood that numerous, substitutions, alterations or modifications can readily be made without departing from the spirit or scope of the invention.

EXAMPLE I

A drying oil-plasticized tackifier resin solution containing the following ingredients was prepared:

PART A

| Material | Pounds |
| --- | --- |
| Toluene | 115 |
| (Tall oil fatty acids) | 20 |
| Linseed oil | 240 |
| Glycerol ester of rosin | 350 |
| Surfanol TG | 0.25 |
| Cobalt Naphthenate | 3.0 |
| | 728.25 | an aqueous phase containing the following ingredients was prepared:

PART B

| Material | Pounds |
| --- | --- |
| water | 96 |
| Polyacrylate Thickener | 14.5 |
| Monoethanolamine (MEA) | 3.7 |

248 pounds of Part A were poured into part B to form an amulsion and 248 pounds of a 41.5 percent solids SBR latex were then added and the mixture stirred until the composition was homogenous. The adhesive was packaged in airtight 1-gallon containers.

It is preferred that the liquid adhesive is prepared in the following sequence of steps. The tackifying resin solids and plasticizer and emulsifier anion are dissolved in an amount of solvent sufficient to form a dispersible solution, suitably about 10–20 percent solvent based on the resin solution. The amount of plasticizer is selected from considerations of the desired initial pressure-sensitive tackiness and degree of final hardening. Usually the plasticizer oil content can range from 0.1 to 1.5 times the amount of resin. The naphthenate drier and antifoam ingredients are usually added to the resin solution.

An aqueous phase containing about 30–50 percent of the final water content is separately formulated containing the protective colloid and the emulsifier cation. The resin solution is dispersed in the aqueous phase and an elastomer latex containing the remainder of the water is then added. The resin solution and elastomer are dispersed throughout the water phase to form an oil in water emulsion.

The final consistency of the liquid adhesive is similar to that of a thick cream and resembles white mayonnaise. The liquid adhesive can be quickly spread by roller, brush or notched spreader onto any commonly encountered floor surface on a basis of about 200–300 square feet per gallon.

To install a flexible construction tile floor covering such as vinyl tile, the existing floor surface such as plywood, hardboard, linoleum, vinyl asbestos, vinyl, asphalt or rubber tile is cleaned to remove dirt and wax. The white liquid adhesive is spread on the floor and turns clear. After about 15 to about 30 minutes sufficient volatiles have evaporated. The residue film is now pressure-sensitive and is ready to receive the vinyl tile squares. The tiles are laid on the residue film in the usual manner and after installation, the tiles can be walked on immediately.

The film continues to cure and oxidatively dries to a harder, more rigid and tenacious condition. In one installation over linoleum, after 3 days the vinyl tile could not be pried from the linoleum. Removal required chipping and cutting thin slices of the installed vinyl square. In laboratory tests an exposed film of the adhesive fully cures and sets in about 4–6 days. A film covered with vinyl tile probably requires a few weeks to reach a fully cured state.

The vinyl tiles installed with the adhesive of this invention have exhibited no tendency to curl, bend or peak at the edges and installations of flexible vinyl flooring tiles or sheets onto commonly encountered existing covered floor surfaces can now be accomplished directly with less skill and care to provide a trouble-free, attractive, and permanently adhered new flooring surface.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A stable oil-in-water liquid emulsion adhesive which forms a pressure-sensitive residue stage after elimination of volatiles and oxidatively dries to form a cured, hard, rigid and tenacious second stage comprising in parts by weight:
    an oil phase including:
        a diene elastomer selected from the group consisting of natural rubber, homopolymers of butadiene, homopolymers of isoprene, polychloroprene, butadiene-isobutylene copolymers, butadiene-acrylonitrile copolymers and butadiene-styrene copolymers —10–25
        drying oil plasticizer—5–20
        $C_{12}$ to $C_{18}$ fatty acid—0.5–3.0
        volatile solvent having a boiling point from 100°–250° F.—5–10
    and
    a water phase including:
        water—30–50
        a volatile, monovalent amine selected from the group consisting of ammonia, alkylamines, monoethanolamine and triethanolamine—1–5
        colloidal thickener comprising hydrophilic aqueous dispersible polymers having a molecular weight above 1,000—0–5

2. An adhesive according to claim 1 in which the amine is selected from he group consisting of monoethanolamine and triethanolamine and the fatty acid is a tall oil fatty acid.

3. An adhesive according to claim 1 in which the plasticizer is present in an amount of 0.1 to 1.5 times the weight of resin.

4. An adhesive according to claim 1 in which the resin is a glycerol ester of rosin and the plasticizer is linseed oil present in an amount of about 40 percent by weight of the resin.

5. An adhesive according to claim 1 further including a minor amount of a metal naphthenate drier.

6. A composition according to claim 5 in which said drying oil plasticizer is selected from the group consisting of linseed oil, tall oil and china wood oil.

7. A composition according to claim 6 in which the elastomer is a butadiene-styrene copolymer.

8. A composition according to claim 2 in which the alkanol amine is monoethanolamine.

9. A composition according to claim 1 in which the thickener is a water soluble salt of polyacrylic acid.

10. A method of adhering flexible construction flooring material normally exhibiting a tendency to shrink or curl on aging to a vapor-impermeable flooring surface comprising the steps of:
    applying to said surface a thin film on a basis of about 200–300 square feet per gallon of a liquid oil-in-water emulsion adhesive composition comprising in parts by weight;
    an oil phase including:
        a diene elastomer selected from the group consisting of natural rubber, homopolymers of butadiene, homopolymers of isoprene, polychloroprene, butadiene-isobutylene copolymers, butadiene-acrylonitrile copolymers and butadiene-styrene copolymers—10–25
        rosin ester tackifying resin—10–30
        drying oil plasticizer—5–20
        $C_{12}$ to $C_{18}$ fatty acid—0.5–3.0
        volatile solvent having a boiling point from 100°–250° F.—5–10
    and
    a water phase including:
        water—30–50
        a volatile, monovalent amine selected from the group consisting of ammonia, alkylamines, monoethanolamine and triethanolamine—1–5
        colloidal thickener comprising hydrophilic aqueous dispersible polymers having a molecular weight above 1,000—0–5
    evaporating volatiles from said composition to form a pressure-sensitive residue film;
    applying the flexible construction material to said residue; and
    air drying said residue to a cured, rigid, hard tenacious film.

11. A method according to claim 10 in which the f flexible construction material is vinyl tile.

12. A method according to claim 10 in which the elastomer is a butadiene-styrene copolymer and the air drying tackifying resin comprises a linseed oil plasticized glycerol ester of rosin and a monoethanolamine-fatty acid emulsifier is present.

13. An adhesively secured flooring installation comprising:
    a vapor-impermeable flooring substrate;
    a layer of flexible construction flooring material; and
    a film of adhesive securing said layer to said substrate, said film comprising a rigid and tenacious air-dried and cured residue of an oil-in-water liquid emulsion adhesive as defined in claim 1.

14. A flooring installation according to claim 13 in which the flooring substrate comprises an installed flooring which is vapor-impermeable and the flexible material is formed of vinyl tile.

* * * * *